United States Patent
Mere et al.

(10) Patent No.: US 9,361,804 B2
(45) Date of Patent: Jun. 7, 2016

(54) METHOD AND DEVICE FOR CALCULATING PREDICTIONS ON A FLIGHT PLAN OF AN AIRCRAFT

(71) Applicant: AIRBUS OPERATIONS (S.A.S), Toulouse (FR)

(72) Inventors: Jean-Claude Mere, Verfeil (FR); Matthieu Aribert, Toulouse (FR); Mathieu Versini, Launaguet (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/222,195

(22) Filed: Mar. 21, 2014

(65) Prior Publication Data
US 2014/0297183 A1 Oct. 2, 2014

(30) Foreign Application Priority Data
Mar. 28, 2013 (FR) ..................... 13 52818

(51) Int. Cl.
*G06G 7/70* (2006.01)
*G06F 19/00* (2011.01)
*G08G 5/00* (2006.01)
*G01C 21/20* (2006.01)

(52) U.S. Cl.
CPC .............. *G08G 5/003* (2013.01); *G01C 21/20* (2013.01); *G08G 5/0039* (2013.01)

(58) Field of Classification Search
USPC .................. 701/3, 537, 14, 120, 300, 24, 122
See application file for complete search history.

(56) References Cited

U.S. PATENT DOCUMENTS

| | | | | |
|---|---|---|---|---|
| 8,060,295 B2* | 11/2011 | Estkowski | ............. | G05D 1/104 340/961 |
| 8,280,626 B2* | 10/2012 | Klooster | ....................... | 701/415 |
| 8,676,404 B2* | 3/2014 | Marty | ................... | G08G 5/0021 244/158.1 |
| 8,744,649 B2* | 6/2014 | Magana Casado et al. | ....... | 701/3 |
| 8,977,482 B2* | 3/2015 | Ballin et al. | .................... | 701/120 |
| 2008/0161982 A1* | 7/2008 | Coulmeau et al. | ................ | 701/3 |
| 2010/0087969 A1* | 4/2010 | Baude et al. | ...................... | 701/3 |
| 2010/0145599 A1* | 6/2010 | Wise et al. | ..................... | 701/120 |
| 2010/0198433 A1* | 8/2010 | Fortier | .................... | G01C 23/00 701/14 |
| 2011/0202251 A1* | 8/2011 | Luppold | ....................... | 701/100 |

(Continued)

FOREIGN PATENT DOCUMENTS

FR 2939505 B1 * 2/2011 ............. G01C 23/00

OTHER PUBLICATIONS

Effects of weather condition on aircraft emissions in climb phase; Serafino, G. ; Mininel, S. ; Stecco, G. ; Nolich, M. ; Ukovich, W. ; Pedroncelli, G.; Digital Avionics Systems Conference (DASC), 2012 IEEE/AIAA 31st ; DOI: 10.1109/DASC.2012.6382306 Publication Year: 2012 , pp. 3A6-1-3A6-12.*

(Continued)

*Primary Examiner* — Cuong H Nguyen
(74) *Attorney, Agent, or Firm* — Jenkins, Wilson, Taylor & Hunt, P.A.

(57) ABSTRACT

The device comprises a flight management system which comprises means for generating requests, for requesting the results of performance functions and a performance function server which is external with respect to the flight management system and comprises means for calculating predictions which are capable of processing the requests and transmitting the results to the flight management system.

14 Claims, 3 Drawing Sheets

(56) References Cited

U.S. PATENT DOCUMENTS

| | | | | |
|---|---|---|---|---|
| 2012/0029737 A1* | 2/2012 | Marty | | G08G 5/0021 701/3 |
| 2012/0116614 A1* | 5/2012 | Torres et al. | | 701/3 |
| 2013/0080043 A1* | 3/2013 | Ballin et al. | | 701/120 |
| 2013/0317670 A1* | 11/2013 | Magana Casado et al. | | 701/3 |

OTHER PUBLICATIONS

An evaluation of the use of the URET prototype tool at Indianapolis and Memphis air route traffic control centers, using benefit metrics; Love, D. ; Horn, W. ; Fellman, L.;Digital Avionics Systems Conference, 2002. Proceedings. The 21st vol. 1; DOI: 10.1109/DASC.2002. 1067883; Publication Year: 2002 , pp. 1A1-1-1A1-12 vol. 1.*

A UAV 3-D space dynamic path planning in complex battlefield environment; Jia Ren ; Wencai Du ; Feng Du; Information Science and Technology (ICIST), 2013 International Conference on; DOI: 10.1109/ICIST.2013.6747794; Publication Year: 2013 , pp. 1379-1383.*

Using air-ground data link and operator-provided planning data to improve ATM decision support system performance; Wanke, C. Digital Avionics Systems Conference, 1997. 16th DASC., AIAA/IEEE; Year: 1997, vol. 2; pp. 9.3-18-9.3-26 vol. 2, DOI: 10.1109/DASC. 1997.637316.*

Complexity analysis in the next generation of air traffic management system; Cano, M.; Sanchez-Escalonilla, P.; Dorado, M.M. Digital Avionics Systems Conference, 2007. DASC '07. IEEE/AIAA 26th; Year: 2007; pp. 3.D.4-1-3.D.4-9, DOI: 10.1109/DASC.2007. 4391890.*

Optimized vertical separation in Europe; Allignol, C.; Barnier, N.; Gondran, A.; Digital Avionics Systems Conference (DASC), 2012 IEEE/AIAA 31st; Year: 2012; pp. 4B3-1-4B3-10, DOI: 10.1109/ DASC.2012.6382334.*

Design and simulation of vertical trajectory predictions in flight management system; Huo Yan; Cheng Nong; Li Qing Guidance, Navigation and Control Conference (CGNCC), 2014 IEEE Chinese ;Year: 2014; pp. 2187-2191, DOI: 10.1109/CGNCC.2014. 7007512.*

An optimization design method for control law of Lateral Navigation; Cheng-Zhi Chi; Zhi-Yong Xiong; Xiao-Min Sun; Lin Qi Digital Avionics Systems Conference (DASC), 2013 IEEE/AIAA $32^{nd}$; Year: 2013; pp. 3C4-1-3C4-8, DOI: 10.1109/DASC.2013.6712565.*

Optimal merging of multiple aircrafts to waypoints via controlled time of arrival windows; Poolla, C.; Ishihara, A.K.; Aerospace Conference, 2013 IEEE; Year: 2013; pp. 1-6, DOI: 10.1109/AERO.2013. 6496934.*

Design and simulation of vertical trajectory predictions in flight management system; Huo Yan; Cheng Nong; Li Qing Guidance, Navigation and Control Conference (CGNCC), 2014 IEEE Chinese; Year: 2014; pp. 2187-2191, DOI: 10.1109/CGNCC.2014.7007512.*

French Search Report for Application No. 1352818 dated Feb. 19, 2014.

\* cited by examiner

METHOD AND DEVICE FOR CALCULATING PREDICTIONS ON A FLIGHT PLAN OF AN AIRCRAFT

TECHNICAL FIELD

The present invention relates to a method and to a device for calculating predictions on a flight plan of an aircraft.

BACKGROUND

It is known that current avionic architectures generally comprise, in a conventional manner, a flight management system (FMS) which offers the crew the possibility of defining before the flight the route to be followed in order to take the passengers to their destination, and of maintaining or changing this route during the flight.

Generally, this flight management system also has the function of calculating, on the basis of the route defined in this manner by the crew, a trajectory (in particular a so-called "5D" trajectory which takes into account the following parameters: altitude, speed, quantity of fuel, time and wind encountered), on which the guiding system of the aircraft will have to base the position of the aircraft.

This calculation of the trajectory is carried out in an iterative manner since the lateral and vertical portions are strongly linked and several calculation loops are required before converging towards a precise solution.

Two examples of these interactions between the lateral and vertical portions of the trajectory are given below by way of illustration:
  firstly, in order to determine the turning radii at each transition between two segments of the flight plan, the system has to know the speed at which the aircraft will fly the transition and vice versa. Furthermore, in order to calculate all the predictions along the trajectory and therefore in particular the speed profile, the system needs to know precisely the total length of the trajectory (including the turning radii of the transitions). Several iterations with increasingly fine hypotheses are therefore required in order to calculate the transitions, then the total length of the trajectory and to loop regarding the evaluation of the speed profile until the desired level of precision is reached;
  secondly, the flight plan may include some types of segments (or legs) which are referred to as "floating", such as, for example, legs which terminate at a given altitude and not at a fixed point, for which the geometry of the lateral trajectory is dependent on the performance of the aircraft. The lateral trajectory, and with it the length of the trajectory, change in accordance with the point at which the aircraft reaches the altitude of the leg. In this example, several successive calculations are required in order to refine the results and to converge towards the final trajectory.

These two examples show that the calculations and in particular the calculations of performance levels implemented in a flight management system are increasingly important and make use of various and numerous calculation means (or integrators) which are combined.

As a result of an increasing number of functions and an increased demand in terms of calculations, in particular in terms of performance calculations, which are dependent on each other, the flight management system (which comprises in particular means for defining a lateral trajectory and means for calculating predictions along this lateral trajectory, implementing performance functions) becomes increasingly complex with in particular disadvantages in terms of change and redundancy of development with other systems.

SUMMARY

An object of the present invention is to simplify the architecture relating to the functions currently implemented in a flight management system, in particular relating to the calculations of predictions. It relates to a device for calculating predictions concerning a flight plan of an aircraft which allows the above-mentioned disadvantages relating to the conventional architecture to be overcome.

To this end, according to the invention, the device for calculating predictions on a flight plan of an aircraft, the device comprising:
  a flight management system which comprises at least means for defining a lateral trajectory; and
  means for calculating predictions along this lateral trajectory, implementing performance functions,
is remarkable in that it further comprises:
  first means which are part of the flight management system in order to generate consolidated requests, via which the specific results of performance functions required for the flight management system are requested, which requests are communicated to a performance function server; and
  the performance function server which is external with respect to the flight management system, is connected to the flight management system via a data transmission connection and comprises means which are capable of processing the requests using the prediction calculation means and transmitting the results to the flight management system.

In this manner, the architecture in accordance with the present invention of the prediction calculation device, as mentioned above, allows the performance calculations to be transferred to a system external with respect to the flight management system (that is to say, the performance function server), whilst making the results available to the flight management system, which allows it to be simplified.

To this end, the processing operations corresponding to the function for defining the lateral portion of the trajectory (which remain in the flight management system) are separated from those corresponding to the calculation of the predictions along this trajectory (which are allocated to the performance function server), and an exchange protocol is defined in the form of requests between these two systems for the calculation of predictions on the flight plan.

More precisely, in the context of the present invention, there are defined requests which are referred to as consolidated and which correspond to requests which ask for the implementation, in a coherent and structured manner, of a plurality of calculations in order to limit the number of exchanges between the two systems, as set out below. This limitation is intended to minimise the negative impact of the externalisation of the prediction calculations of the flight management system on the response time owing to the fact that these exchanges will be carried out via data transmission connections which preferably form part of a communication network of the aircraft, and not between different modules of the same processor.

In the context of the present invention:
  the term performance functions is intended to be understood to be a group of performance calculations and reading performance data whose results provide a direct service to the flight management system of the aircraft. The information generated by these performance functions are called "performance function results" and represent the results of performance calculations and/or the direct recovery of information read from performance data;

the term performance data is intended to be understood to be data tables which represent parameters of the aircraft (aerodynamics, engines, etc.) which are used for a calculation of the mechanics of the flight, referred to as performance; and the term performance calculation is intended to be understood to be a calculation of the mechanics of the flight illustrating the behaviour of the aircraft and using performance data.

Furthermore, the performance function server advantageously comprises, in addition to the calculation means, at least one performance database and a request management unit. Furthermore, the performance function server is preferably a centralised performance calculation processor (which is intended, in addition to the flight management system, for other systems of the aircraft).

Furthermore, advantageously:

the performance function server comprises means which are capable of storing intermediate results and transmitting them to the flight management system at the same time as other results when a guide-mode change point is reached; and/or the first means are configured to form requests which include a selection tree, through which the performance function server navigates in order to identify different integration means to be used.

Furthermore, the device advantageously comprises means for selecting guiding orders (and thus for selecting integration means to be used) which are part of the flight management system or the performance function server.

The present invention also relates to a method for calculating predictions on a flight plan of an aircraft, the method comprising:

a step of defining a lateral trajectory which is implemented in a flight management system; and a step of calculating predictions along this lateral trajectory implementing performance functions.

According to the invention, this method further comprises a step of generating consolidated requests, via which the specific results of performance functions required for the flight management system are requested, which requests are communicated to a performance function server which is external with respect to the flight management system, and the step of calculating predictions is implemented in the performance function server which is connected to the flight management system via a data transmission connection, and which transmits the results of the performance functions to the flight management system.

Advantageously:

the performance function server stores intermediate results and transmits them to the flight management system at the same time as other results when a guide-mode change point is reached; and/or the requests comprise a selection tree, through which the performance function server navigates in order to identify different integration means to be used.

The present invention thus provides a solution for externalising the prediction calculations of the flight management system in a performance function server, and for optimising the exchanges between this flight management system and the server.

The present invention further relates to an aircraft, in particular a transport plane, which is provided with a device for calculating predictions on a flight path, such as the one mentioned above. Advantageously, the aircraft comprises a data transmission network via which the performance function server is connected at least to the flight management system, and optionally to other systems of the aircraft which are capable of using in particular the performance function results thereof.

BRIEF DESCRIPTION OF THE DRAWINGS

The Figures of the appended drawings will provide a good understanding of how the invention can be implemented. In these Figures, elements which are similar are given identical reference numerals.

DETAILED DESCRIPTION

Figure 1:
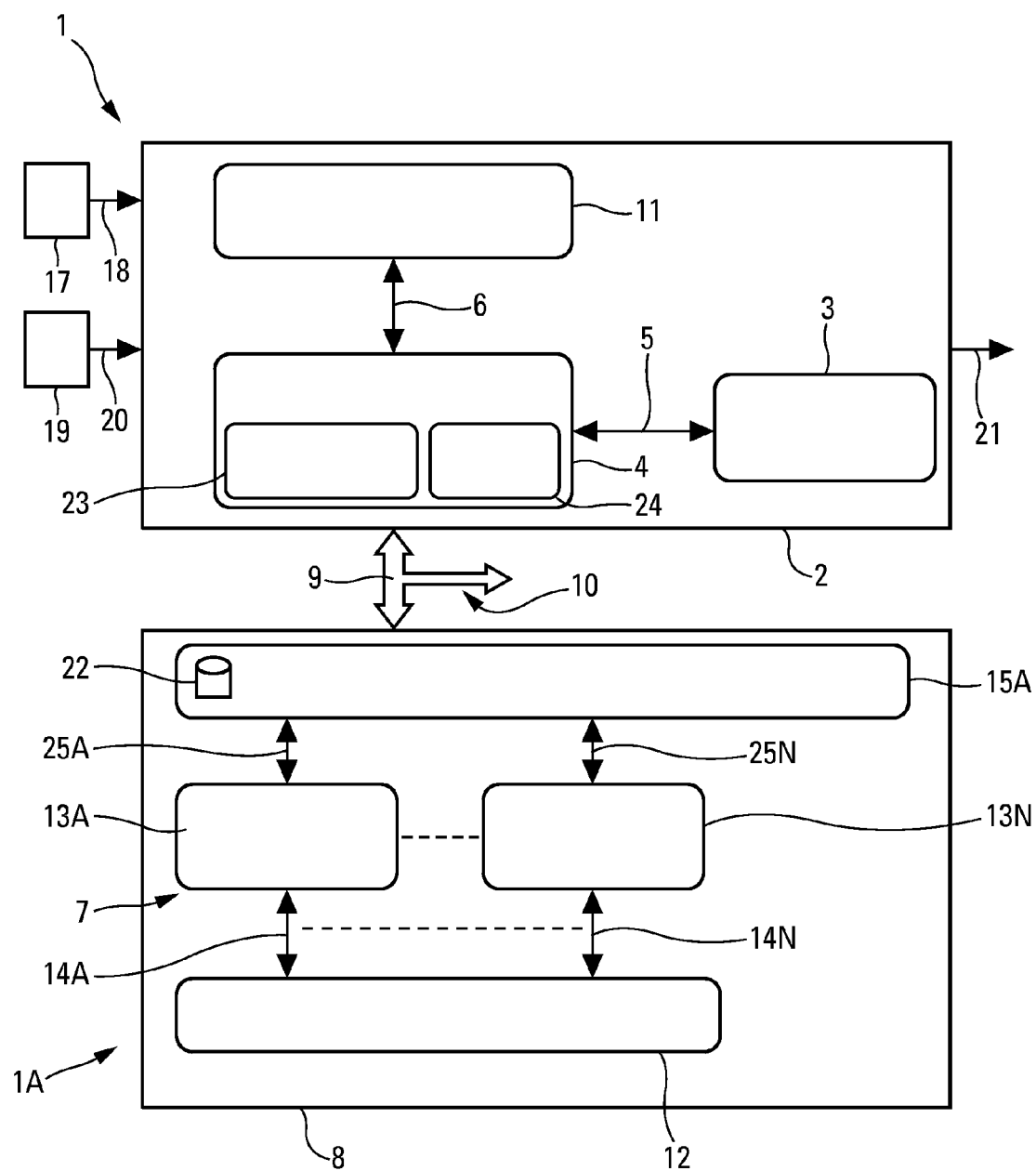
FIGS. 1 and 2 are block diagrams of two different embodiments of a prediction calculation device, which allows the invention to be illustrated.
Figure 2:
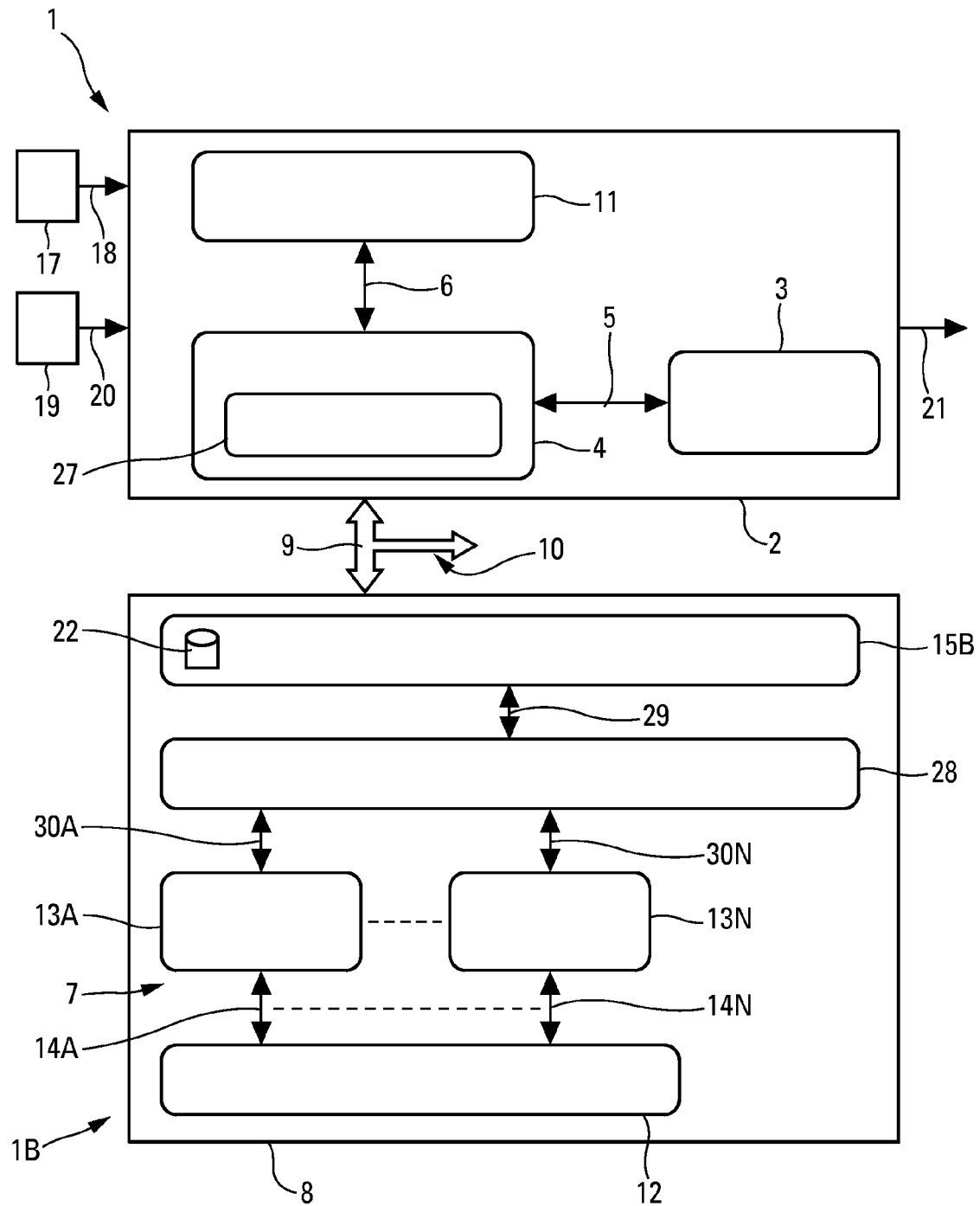
Figure 3:
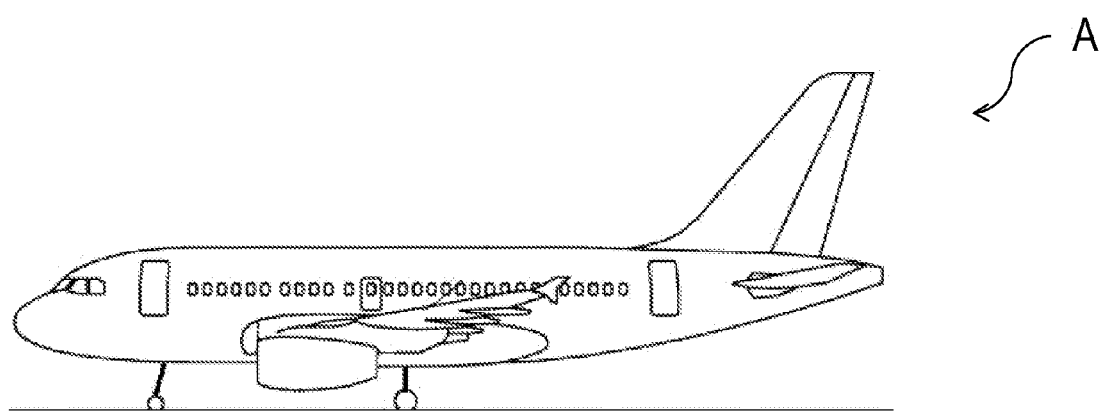
FIG. 3 is a side view of an aircraft according to some embodiments of the subject matter described herein.

The device 1 which illustrates the invention and which is illustrated schematically according to two slightly different embodiments 1A and 1B in FIGS. 1 and 2 is a device for calculating predictions on a flight plan of an aircraft A as illustrated in FIG. 3, in particular of an aeroplane and in particular a transport plane.

In a conventional manner, the device 1 which is on-board comprises a flight management system 2 which comprises, in particular, a conventional data processing unit 3 which has the function of defining a lateral trajectory from a list of waypoints.

The flight management system 2 further comprises:

an assembly 11 of conventional modules of the system 2; and a prediction management unit 4 which is connected via connections 5 and 6 to the data processing unit 3 and to the assembly 11 of modules, respectively.

The device 1 also comprises means 7 for calculating predictions along the lateral trajectory, which implement performance functions.

According to the invention, the device 1 further comprises an on-board performance function server 8 which is external with respect to the flight management system 2, is connected to the flight management system 2 via a data transmission connection 9 and comprises the prediction calculation means 7 which are capable of processing the requests and transmitting the results to the flight management system 2. The performance function server 8 accommodates at least a portion and preferably all of the performance functions relating to the predictions concerning a flight plan.

Preferably, the data transmission connection 9 is part of a conventional data transmission network 10 of the aircraft, in particular of the AFDX or Ethernet type, as illustrated by enlarged arrows in FIGS. 1 and 2.

Furthermore, according to the invention, the unit 4 generates consolidated requests, via which the specific performance function results are requested which are necessary for the flight management system 2, which requests are communicated to the performance function server 8 via the connection 9.

The performance function server 8 comprises:

at least one conventional performance database 12 which is an entity of the static memory type. This performance database 12 stores a large number of conventional performance data tables, that is to say, data tables which represent parameters of the aircraft (aerodynamics, engine, etc.) which are used for conventional calculations of the mechanics of the flight, referred to as performance calculations;

performance calculation means 13A to 13N (N being a whole number greater than or equal to 2), in particular integration means (or integrators) which carry out all the performance calculations, that is to say, mechanical calculations of the flight illustrating the behaviour of the aircraft and using the performance database 12 to which the conventional means 13A to 13N are connected via connections 14A to 14N, respectively. The performance calculation means 13A to 13N preferably contain all the performance calculation functions which are capable of being used on the aircraft for the calculation of predictions on the flight plan; and a request control (or management) unit 15A, 15B which is connected to the connection 9 and which is connected directly or indirectly to the means 13A to 13N.

The control unit 15A, 15B is responsible for receiving requests from the flight management system 2 and transmitting to it the information requested which has been provided by the performance calculation means 13A to 13N, using the database(s) 12 of the performance function server 8.

Furthermore, the performance function server 8 also comprises conventional means 22, that is to say, a dynamic memory entity, which are, for example, integrated in the control unit 15A, 15B in order to store the performance calculation results that the means 13A to 13N have produced.

In this manner, the architecture in accordance with the present invention of the prediction calculation device 1 allows the performance calculations to be transferred to the performance function server 8 which is external with respect to the flight management system 2, whilst making the results available to the flight management system 2.

To this end, the processing operations which correspond to the function of defining the lateral portion of the trajectory implemented by the unit 3 (of the flight management system 2) are separated from those corresponding to the calculation of the predictions along this trajectory (which are allocated to the performance function server 8) and an exchange protocol in the form of requests is provided between these two systems 2 and 8 for the calculation of the predictions on the flight plan.

To this end, the unit 4 generates requests which are referred to as being consolidated and which correspond to requests which require the implementation, in a coherent and structured manner, of several calculations (or even several performance functions) in order to limit the number of exchanges between the two systems 2 and 8. This limitation is intended to minimise the negative impact of the externalisation of the prediction calculations of the flight management system on the response time owing to the fact that these exchanges will be carried out via the data transmission connection 9 and not between different modules of the same processor.

There is thus carried out an optimisation of the processing operations which are currently implemented in a conventional flight management system in order to better segregate the different components and thus to be able to isolate a portion of these processing operations in a dedicated system 8 which preferably provides a centralised service for performance calculation to other systems (not illustrated) of the aircraft which may require it and which may be connected for this purpose to the system 8 via the network 10.

In a specific embodiment, the device 1 further comprises:
an assembly 17 of conventional data sources which are capable of determining the current values of flight parameters of the aircraft (speed, altitude, etc.) and providing them to the system 2 via a connection 18; and
an input device 19, for example a keyboard or any other means such as a track ball or a trackpad, which allows an operator, in particular a pilot of the aircraft, to enter data into the system 2. This can transmit information which it has available to user means (not illustrated) via a connection 21.

Furthermore, in the specific embodiment 1A of FIG. 1, the device 1 comprises means 23 for selecting guiding orders (and thus for selecting corresponding integrators 13A to 13N to be used), which are part of the unit 4 of the flight management system 2.

Furthermore, the unit 4 (for prediction control) comprises means 24 for creating requests.

In this embodiment 1A, the unit 15A is intended:
to interpret requests received from the system 2 (via the connection 9);
to transmit the requests to the different integration means 13A to 13N via connections 25A to 25N, respectively; and
to transmit to the system 2 the final result received from the integration means 13A to 13N.

Furthermore, in the second embodiment 1B illustrated in FIG. 2, the unit 4 comprises means 27 for controlling requests, and the means for selecting guiding orders (and thus for selecting corresponding integrators 13A to 13N to be used) are integrated in a unit 28 of the server 8.

This unit 28 is connected:
on the one hand, via a connection 29, to the unit 15B which is intended to interpret the requests received from the system 2 and to transmit the final result to the system 2; and
on the other hand, via connections 30A to 30N to the different calculation or integration means 13A to 13N to which it transmits the requirements corresponding to the requests.

If an attempt were made to reproduce the current calculation diagram of the flight management system in a dual-system architecture where the calculation of the predictions is carried out in a centralised manner in the aircraft, the division of the flight plan into basic legs is such that the number of calls with respect to the integrators would become prohibitive in terms of response time and would therefore not enable satisfactory operational use. In the conventional definition of the flight management system, a call with respect to the integrators is carried out at each leg terminating with a point on the flight plan; some changes of the guide mode may also occur between two points, which leads to a leg being subdivided into two. There is considered the example of a portion of a flight plan, with an ascent phase with altitude restrictions to be complied with and the identification of the point at which the time marker is passed or at which two different integrators are required: an integrator of the "ascent at constant speed" type (SPD/THR mode in ascent) and an integrator of the "level flight at constant speed" type (ALT/SPD mode). In this example, it is assumed that the aircraft is at an altitude greater than 10000 feet and that it has reached the optimum ascent speed before the first point. In this example, with regard to the conventional definition, there are as many requests as points in the flight plan plus two intermediate exchanges between two points when the restrictions of altitude and passage time are reached, a complete flight plan further being able to contain up to 250 points.

In a first simplified embodiment of the invention, since the guide mode (and therefore the type of integrator 13A to 13N required) does not necessarily change when passing a point on the flight plan, it is not necessary to return the state of the aircraft resulting from the calculation of integration systematically at each point on the flight plan if the aircraft remains in the same mode at one side and the other of the point. In this case, the server 8 simply stores the calculation results as intermediate results (for example, in the means 22) and returns them to the flight management system 2 at the same time as the other results when the integrator used reaches a guide-mode change point (levelling out, for example, etc.).

For the example mentioned above, the advantage obtained (by this first simplified implementation) with respect to the quantity of data exchanged and therefore in terms of a first approximation the time saved on the exchanges between the two systems 2 and 8 may be 30%: until the final point on the ascent or the altitude restriction is reached. If the altitude restriction is reached first, the unit 15A to 15B returns to the flight management system 2 the result of the calculations at the preceding points in the same message and the system sends it a new request up to the restriction point, changing the integrator for the level flight phase. When the restriction point is passed, a new exchange allows the flight management system 2 to recover the calculation results of the level flight at the restriction altitude and to resend an ascent calculation request up to the last point on the ascent. Furthermore, if the last point is reached before the altitude restriction, any integration is carried out in a single iteration and the integration module returns all of the results for the purposes of calculation.

In a second preferred embodiment of the present invention, the unit 4 defines the requests in the form of a conditional tree (or selection tree) which allows the different sequences of possible guiding orders to be considered for the calculation to be specified to the unit 15A, 15B in accordance with the conditions encountered, without the unit having to revert to the flight management system 2.

In accordance with the actual performance levels of the aircraft, the complete sequence of the guiding orders which allow all of the flight plan to be covered is not known in advance. A speed restriction may, for example, be reached before an altitude restriction or vice versa, which leads to two different calculations using either different integration means 13A to 13N or the same integration means 13A to 13N but in a different order.

By way of example, for an ascent point which has both a speed restriction and an altitude restriction, the first portion of the profile is calculated by using an integrator of the type "ascent with acceleration". If the altitude restriction is reached before the speed restriction, the next integrator to be used is of the type "level flight with acceleration", then "level flight with constant speed" if the speed restriction is in turn reached before passing the point. In contrast, if the speed restriction is reached before the altitude restriction, the next integrator to be used is of the type "ascent with constant speed", then "level flight with constant speed" when the restriction altitude is reached, assuming that it is reached before the point.

In the first simplified embodiment mentioned above, exchanges are necessary between the flight management system 2 and the performance calculation server 8 each time a restriction is reached. The system 2 must then designate the next type of integrator to be used so that the calculation continues.

By defining requests including a selection tree, through which the performance function server 8 only has to navigate in order to identify the different integrators to be used, it is possible to give greater autonomy to the server 8, which limits the exchanges whilst preventing an excessive degree of complexity from being added to it (complex logics for selecting guiding orders in accordance with the definition of the flight plan remain in the flight control system 2 for the generation of requests).

In the above-mentioned example, with a restriction of altitude at a route point on the type "AT or BELOW", at 4000 feet and taking into account the speed limitation to 250 knots below 10000 feet, the flight management system 2 can send only a single request to the server 8 in the form of a complex logic operation for selecting different types of integrators associated with different output conditions, from the following possibilities:
  types of integrator possible during ascent:
    accelerated ascent;
    ascent at constant speed;
    maintaining level flight with acceleration;
    maintaining level flight with constant speed;
  output conditions which can be envisaged:
    reaching a given altitude;
    reaching a given speed;
    moving into a point on the flight plan.

Regardless of the encoding retained, the request can be expressed, in a specific embodiment, in accordance with the following logic, taking into account nine successive route points referred to as "point 1" to "point 9".

This logic involves:
from point 1 to point 9, using the integrator "ascent with acceleration" with an output condition 1/ on the altitude of 4000 feet, an output condition 2/ when passing the point 8 and an output condition 3/ on the speed of 250 knots:
  if 1/ is complied with, using the integrator "level flight with acceleration" with an output condition 4/ when passing the point 8 and an output condition 5/ on the speed of 250 knots:
    if 4/ is complied with, using the integrator "ascent with acceleration" with an output condition 10/ on the altitude of 10000 feet, an output condition 11/ on the speed of 250 knots and an output condition 12/ when passing the point 9:
      if 10/ is complied with, using the integrator "ascent with acceleration" up to the point 9 and returning the results to the flight management system 2;
      if 11/ is complied with, using the integrator "ascent at constant speed" with an output condition 13/ on the altitude of 10000 feet and an output condition 14/ when passing the point 9:
        if 13/ is complied with, using the integrator "ascent with acceleration" up to the point 9 and returning the results to the flight management system 2;
        if 14/ is complied with, returning the results to the flight management system 2;
      if 12 is complied with, returning the results to the flight management system 2;
    if 5/ is complied with, using the integrator "level flight at constant speed" up to the point 8, then using the integrator "ascent at constant speed" with an output condition 16/ on the altitude of 10000 feet, and an output condition 17/ when passing the point 9:
      if 16/ is complied with, using the integrator "ascent with acceleration" up to the point 9 and returning the results to the flight management system 2;
      if 17/ is complied with, returning the results to the flight management system 2;
  if 2/ is complied with, using the integrator "ascent with acceleration" with an output condition 6/ on the speed of 250 knots and an output condition 7/ when passing the point 9:

if 6/ is complied with, using the integrator "ascent at constant speed" with an output condition 18/ on the altitude of 10000 feet and an output condition 19/ when passing the point 9:
  if 18/ is complied with, using the integrator "ascent with acceleration" up to the point 9 and returning the results to the flight management system 2;
  if 19/ is complied with, returning the results to the flight management system 2;
  if 7/ is complied with, returning the results to the flight management system 2;
if 3/ is complied with, using the integrator "ascent at constant speed" with an output condition 8/ on the altitude of 4000 feet and an output condition 9/ when passing the point 8:
  if 8/ is complied with, using the integrator "level flight at constant speed" up to the point 8, then using the integrator "ascent at constant speed" with an output condition 21/ on the altitude of 10000 feet, and an output condition 22/ when passing the point 9:
    if 21 is complied with, using the integrator "ascent with acceleration" up to the point 9 and returning the results to the flight management system 2;
    if 22 is complied with, returning the results to the flight management system 2;
  if 9/ is complied with, using the integrator "ascent at constant speed" with an output condition 23/ on the altitude at 10000 feet and an output condition 24/ when passing the point 9:
    if 23/ is complied with, using the integrator "accelerated ascent" up to the point 9 and returning the results to the flight management system 2;
    if 24/ is complied with, returning the results to the flight management system 2.

In this example, a five-level tree allows all the cases to be covered in a single request. It is sufficient for the server 8 to run through the selection tree in accordance with the results obtained. The flight management system 2 must generate the request in accordance with the definition of the flight plan by envisaging all the possible configurations whilst, in a conventional architecture, it recovers the results gradually and envisages only the flight configuration corresponding to the case encountered.

In a specific embodiment, it is also possible to envisage limiting the number of levels of the tree in order to find the best compromise between the number of requests exchanged and the complexity of the generation of the possible request for the flight management system 2.

Owing to the invention, there is therefore obtained:
  a method for exchange in the form of requests (interface) between a flight management system 2 and an external performance function server 8 which is preferably centralised in the region of the aircraft, in order to optimise the calculation time and to make it at least equivalent to that of a conventional flight management system for which the calculation of the predictions along the flight plan is carried out internally, without passing via a communication network 10 of the aircraft;
  determination of the sequence of the modes according to which the aircraft must be guided in order to follow the flight path, this function itself being able to be remote in the server 8 in a specific embodiment of the invention; and
  generation of requests which are more or less complex (in accordance with the definition of the flight plan) to the external server 8 in order to calculate the predictions (altitudes, speeds, passage time, quantity of fuel, etc.) along the flight plan.

The invention claimed is:

1. A device for calculating predictions on a flight plan of an aircraft, the device comprising:
  a flight management system which comprises at least a data processing unit for defining a lateral trajectory;
  a performance function server external with respect to the flight management system that is connected to the flight management system via a data transmission connection that forms part of a communication network of the aircraft and is configured to improve response time;
  a prediction calculation device for calculating predictions along the lateral trajectory and implementing performance functions that comprise a group of performance calculations and performance data reading, wherein the prediction calculation device is externalized from the flight management system in the performance function server; and
  a prediction management unit configured to generate consolidated requests through which results of the performance functions required for the flight management system are requested and communicate the consolidated requests to the performance function server, the consolidated requests corresponding to requests requiring implementation of several calculations;
  wherein the performance function server comprises a request control unit for processing the consolidated requests using the prediction calculation device and transmitting the results to the flight management system.

2. The device according to claim 1, wherein the performance function server comprises at least one performance database and a request management unit.

3. The device according to claim 1, wherein the performance function server comprises a memory entity for storing intermediate results and transmitting them to the flight management system at a same time as other results when a guide-mode change point is reached.

4. The device according to claim 1, wherein the prediction management unit is configured to form requests which include a selection tree, through which the performance function server navigates in order to identify different integrators to be used.

5. The device according to claim 1, wherein the performance function server is a centralised performance calculation processor which is intended for a plurality of aircraft systems.

6. The device according to claim 1, further comprising a module for selecting guiding orders.

7. The device according to claim 6, wherein the selection module is part of the flight management system.

8. The device according to claim 6, wherein the selection module is part of the performance function server.

9. A method for calculating predictions on a flight plan of an aircraft, the method comprising:
  defining a lateral trajectory which is implemented in a flight management system;
  calculating predictions along the lateral trajectory which implements performance functions comprising a group of performance calculations and performance data reading;
  generating, by a prediction management unit, consolidated requests through which results of the performance functions required for the flight management system are requested, the consolidated requests being communicated to a performance function server which is external with respect to the flight management system and corresponding to requests which require implementation of several calculations; and processing the consolidated requests in a request control unit of the performance function server;

wherein calculating the predictions is implemented in a prediction calculation device that is externalized from the flight management system in the performance function server which is connected to the flight management system via a data transmission connection that forms part of a communication network of the aircraft and is configured to improve response time, and which transmits the results of the performance functions to the flight management system.

10. The method according to claim 9, further comprising storing, by the performance function server, intermediate results and transmitting the intermediate results to the flight management system at a same time as other results when a guide-mode change point is reached.

11. The method according to claim 9, wherein the requests comprise a selection tree, through which the performance function server navigates in order to identify different integrators to be used.

12. An aircraft comprising:
a flight management system which comprises at least a data processing unit for defining a lateral trajectory;
a performance function server external with respect to the flight management system that is connected to the flight management system via a data transmission connection that forms part of a communication network of the aircraft and is configured to improve response time;
a prediction calculation device for calculating predictions along the lateral trajectory and implementing performance functions that comprise a group of performance calculations and performance data reading, wherein the prediction calculation device is externalized from the flight management system in the performance function server; and
a prediction management unit configured to generate consolidated requests through which results of the performance functions required for the flight management system are requested and communicate the consolidated requests to the performance function server, the consolidated requests corresponding to requests requiring implementation of several calculations;
wherein the performance function server comprises a request control unit for processing the consolidated requests using the prediction calculation device and transmitting the results to the flight management system.

13. The aircraft according to claim 12, wherein the performance function server is connected at least to the flight management system via the communication network of the aircraft.

14. A method for calculating predictions on a flight plan of an aircraft, the method comprising:
providing a flight management system which comprises at least a data processing unit for defining a lateral trajectory;
providing a performance function server external with respect to the flight management system that is connected to the flight management system via a data transmission connection that forms part of a communication network of the aircraft and is configured to improve response time;
providing a prediction calculation device for calculating predictions along the lateral trajectory and implementing performance functions that comprise a group of performance calculations and performance data reading, wherein the prediction calculation device is externalized from the flight management system in the performance function server; and
providing a prediction management unit configured to generate consolidated requests through which results of the performance functions required for the flight management system are requested and communicate the consolidated requests to the performance function server, the consolidated requests corresponding to requests requiring implementation of several calculations;
wherein the performance function server comprises a request control unit for processing the consolidated requests using the prediction calculation device and transmitting the results to the flight management system.

* * * * *